Patented July 14, 1936

2,047,656

UNITED STATES PATENT OFFICE 2,047,656

MANUFACTURE OF 4-ACETYL-5-TERTIARY-BUTYL-1,3-XYLENE

Walter V. Wirth, Woodstown, N. J., assignor to E. I. du Pont de Nemours & Company, Wilmington, Del., a corporation of Delaware No Drawing. Application February 1, 1934, Serial No. 709,288

7 Claims. (Cl. 260—131)

This invention relates to the preparation of organic compounds. More particularly, it relates to an improved process for the manufacture of 4-acetyl-5-tertiary-butyl-1,3-xylene:

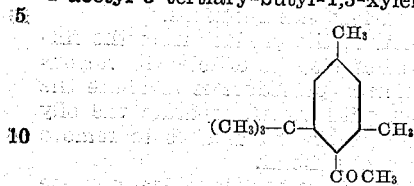

hereinafter designated as ATBMX.

It is an object of this invention to provide an efficient and economical method for the manufacture of the above compound, whereby the same is obtained in high yield, and is susceptible of recovery in pure form with a minimum of labor. It is a further object of this invention to provide a process for the manufacture of ATBMX, whereby the excess of initial material, namely 5-tertiary-butyl-1,3-xylene (hereinafter designated as TBMX), may be recovered in a sufficient degree of purity to make this compound usable directly in the further preparation of ATBMX or in the manufacture of musk-xylene. Other and further important objects of this invention will appear as the description proceeds.

4-acetyl-5-tertiary-butyl-1,3-xylene (ATBMX) has been manufactured in the art by dropping in gradually acetyl chloride into a mixture of tertiary-butyl-meta-xylene (TBMX) and aluminum chloride. In one process reported in the literature, carbon disulfide was used as a solvent. In another reported process no solvent was used. In either process, the quantity of TBMX employed was in excess of one mol per mol of acetyl chloride, while the quantity of aluminum chloride was less than 1 mol. In both cases slightly elevated temperature was employed during the reaction.

Neither of the two processes reported any definite yields, but by actual trial I have found them to be very low. The yield in the process using no solvent at all was around 35% of theory, based on the quantity of acetyl chloride employed, which is altogether too low for commercial practice. In the process employing carbon disulfide as a solvent, the yield was much better, but still far from satisfactory. Moreover, this process, using as it does carbon disulfide, is first of all complicated and hazardous during the operation, and secondly entails a laborious and costly procedure for recovery of the desired product.

I have now found that the process is considerably improved if instead of adding acetyl chloride to a mixture of TBMX and aluminum chloride, one feeds gradually anhydrous aluminum chloride into a mixture of TBMX and acetyl chloride. I have found that this apparently simple interchange of steps has a remarkable effect on the yield and quality of the crude product and enables the recovery therefrom of both ATBMX and excess TBMX in a high state of purity with a minimum amount of labor. Moreover, this process does not require the presence of carbon disulfide or any other solvent, an excess of TBMX being employed instead, thereby further facilitating the separation of the reaction mass into its components with a maximum degree of economy.

I have further found that the yield is considerably improved by employing an amount of aluminum chloride not substantially less than one mol (calculated as AlCl₃) per mol of acetyl chloride.

I have further found that both yield and purity of the final product gain considerably if the reaction is carried out below room temperature; preferably, between 0° and 10° C.

Finally, I found it possible in my improved process to replace part or all of the acetyl chloride by acetic anhydride, which may have its advantages under certain circumstances, in view of the lower cost of acetic anhydride. Acetyl bromide, although offering no special economic advantage, may also be used.

My improved process accordingly consists of mixing an acetyl halide or acetic anhydride with an excess of tertiary-butyl-meta-xylene, cooling the mixture to a temperature between 0 and 10° C., feeding in anhydrous aluminum chloride, or other metal halide condensing agent, while keeping the temperature from rising substantially above the upper limit indicated, then working up the reaction mass to recover the ATBMX formed and the excess of TBMX. This recovery step, according to my improved and simplified procedure, may consist of drowning the reaction mass in water, adding acid to decompose the intermediate organic-aluminum-chloride addition compound formed in the reaction, separating the oily layer, and after the usual washing procedures, subjecting the same to fractional distillation under a vacuum. The distillation step generally separates the ATBMX and TBMX very effectively, except for a small middle fraction which contains a mixture of the two and which may be added to the next distillation batch.

The 4-acetyl-5-tertiary-butyl-1,3-xylene thus obtained is sufficiently pure to be used directly for nitration to form musk-ketone. Its yield is very high. The 5-tertiary-butyl-1,3-xylene recovered is sufficiently pure to be used directly in the next acetylation batch, or to be nitrated into musk-xylene. The loss of this compound during operation, except for the quantity transformed into the acetyl derivative, is small.

Without limiting my invention to any particular procedure, the following examples in which parts by weight are given will serve to illustrate my preferred mode of operation. Parts given are by weight.

Example 1

An enamel kettle equipped with a cooling jacket and agitator was charged with 575 parts of tertiary-butyl-m-xylene and 78.5 parts (1 mol) of acetyl chloride. The charge was cooled to 0 to 3° C. and 145.5 parts of aluminum chloride powder (1.09 mols; based on actual AlCl₃ analysis) were gradually added over a period of 1 hour, keeping the temperature of the mass at 0 to 3° C. HCl gas was evolved from the mass and an insoluble AlCl₃ addition compound was formed. The charge was stirred for four hours longer at 0 to 3° C. It was drowned, then dumped into a mixture of 600 parts of crushed ice and 300 parts of water. 10 parts of 20° Bé. HCl were added and stirring was continued for ½ hour under 20° C. to completely decompose the aluminum chloride addition compound. The mass was then allowed to settle ½ hour, and the bottom, aqueous layer was separated from the top layer of almost colorless oil. The oil was washed twice with 800 parts of water at 20° C. and then once with 800 parts of water containing 1 part of sodium carbonate to remove the last trace of acidity. The oil, which is a solution of acetyl-tertiary-butyl-m-xylene in tertiary-butyl-m-xylene, was fractionally distilled as follows:

Cut 1 water and TBMX—total 4 parts at 35° to 83° C. under 11-12 mm.

Cut 2 TBMX—426 parts at 83° to 86° C. under 11-12 mm.

Cut 3 ATBMX+TBMX—total 12 parts at 68° to 98° C. under 2 to 3 mm.

Cut 4 ATBMX—162 parts at 98° to 100° C. under 2 to 3 mm.

Both products were obtained in a high degree of purity. The ATBMX from cut 4 had a freezing point of 46° C.

Example 2

The same reaction vessel as used for Example 1, was charged with 650 parts of TBMX and 107.5 parts of acetic anhydride, 95% (1 mol). The charge was cooled to 0 to 3° C. and 180 parts of aluminum chloride powder were gradually added over a period of 1 hour. An aluminum-chloride-addition-compound was formed as a thick, non-crystalline mass. The mass was stirred for 4 hours at 0 to 3° C. and then worked up as in Example 1. 147 parts of acetyl-tertiary-butyl-m-xylene were obtained, and 513 part of TBMX were recovered. Both were of a high degree of purity.

It will be readily apparent to one skilled in the art that my new process above set forth is subject to variations in many respects, among which may be mentioned the following:

1. The quantity of TBMX used as solvent, as compared with the quantity converted to ATBMX, may be varied within wide limits. The lower limit is that at which the reaction mass becomes too viscous for proper agitation and heat control; the upper limit is dictated by economic considerations. Generally, 2 to 6 mols will give good results.

2. The quantity of anhydrous aluminum chloride used may be more than 1 mol. 1 to 1.5 mols per mol acetyl-chloride or acetic anhydride gives satisfactory results.

3. Instead of aluminum chloride any other metal halide condensing agent may be used, for instance ferric chloride or zinc chloride; except that here the reaction is slower and the yield somewhat lower.

4. The temperature at which the condensation is effected is subject to considerable variations. However, it is preferable to carry out the reaction within the range of 0°-10° C., since at lower temperatures the rate of reaction is low, and at higher temperatures, lower yields of ATBMX are obtained and the recovery of TBMX is less satisfactory, due to various side reactions.

5. The isolation of the product from the finished reaction mass may be effected in various ways. The preferred procedure is to dilute the reaction product with water, separate the oily layer, wash with water and alkalies to remove acid, then fractionally distill.

Many other variations and modifications are possible in my preferred mode of operation, without departing from the spirit of this invention.

In the claims below the term "metal halide condensing agent" is to be understood as referring to a metal halide of the group which are generally effective as condensing agents in Friedel-Crafts synthesis.

I claim:

1. In the process of producing 4-acetyl-5-tertiary-butyl-1,3-xylene by the acetylation of tertiary-butyl-meta-xylene, the improvement which comprises first mixing tertiary-butyl, meta-xylene with the acetylating agent and then adding gradually a metal halide condensing agent, the reaction being carried out in the absence of an extraneous solvent.

2. The process of introducing an acetyl group into tertiary-butyl-meta-xylene, which comprises mixing tertiary-butyl-meta-xylene with an acetylating agent selected from the group consisting of acetyl halides and acetic anhydride, and then adding gradually anhydrous aluminum chloride, the reaction being carried out at a temperature between 0° and 10° C. and the aluminum chloride being employed in a quantity not substantially less than that corresponding to one mol of aluminum chloride per mol of acetylating agent.

3. A process as in claim 2, the tertiary-butyl-meta-xylene being used in excess, whereby to dilute the reaction mass.

4. In the process of producing 4-acetyl-5-tertiary-butyl-1,3-xylene, the step which comprises feeding slowly anhydrous aluminum chloride into a mixture of tertiary-butyl-meta-xylene and acetyl chloride, while maintaining the latter at a temperature between 0° and 10° C., and continuing the process until substantially 1 to 1.5 mols of AlCl₃ have been entered, for each mol of acetyl chloride in the original mixture.

5. A process for producing 4-acetyl-5-tertiary-butyl-1,3-xylene, which comprises mixing one molal ratio of acetyl chloride with 2 to 6 molal ratios of tertiary-butyl-meta-xylene, cooling the mixture to between 0° and 10° C., adding gradually substantially 1 mol of aluminum chloride while maintaining the reaction mass at below 10° C. and recovering 4-acetyl-5-tertiary-butyl-1,3-xylene from the reaction mass.

6. A process for producing 4-acetyl-5-tertiary-butyl-1,3-xylene, which comprises feeding slowly substantially 1 mol of anhydrous aluminum chloride into a mixture of substantially 1 mol of acetyl chloride and 2 to 6 mols of tertiary-butyl-meta-xylene, while maintaining the mass at a temperature between 0° and 10° C., diluting the reaction mass in water, acidifying the diluted mass to decompose the aluminum-chloride-organic addition-compound formed in the reaction, separating the mass into layers, and recovering from the oily layer 4-acetyl-5-tertiary-butyl-1,3-xylene.

7. A process for producing 4-acetyl-5-tertiary-butyl-1,3-xylene, which comprises feeding slowly substantially 1 mol of anhydrous aluminum chloride into a mixture of substantially 1 mol of acetyl chloride and 2 to 6 mols of tertiary-butyl-meta-xylene, while maintaining the mass at a temperature between 0° and 10° C., diluting the reaction mass in water, acidifying the diluted mass to decompose the aluminum-chloride-organic addition-compound formed in the reaction, separating the mass into layers, and subjecting the oily layer to distillation whereby to separate the acetyl-tertiary-butyl-xylene from unchanged tertiary-butyl-meta-xylene.

WALTER V. WIRTH.